(12) United States Patent
Tsirkin et al.

(10) Patent No.: US 10,255,099 B2
(45) Date of Patent: *Apr. 9, 2019

(54) GUEST-INFLUENCED PACKET TRANSMISSION

(71) Applicant: Red Hat Israel, Ltd., Raanana (IL)

(72) Inventors: Michael Tsirkin, Raanana (IL); Veaceslav Falico, Raanana (IL)

(73) Assignee: RED HAT ISRAEL, Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/943,421

(22) Filed: Apr. 2, 2018

(65) Prior Publication Data

US 2018/0225141 A1  Aug. 9, 2018

Related U.S. Application Data

(63) Continuation of application No. 14/527,160, filed on Oct. 29, 2014, now Pat. No. 9,934,058.

(51) Int. Cl.
*G06F 9/455* (2018.01)

(52) U.S. Cl.
CPC ............... *G06F 9/45558* (2013.01); *G06F 2009/45595* (2013.01)

(58) Field of Classification Search
CPC ................ G06F 9/45558; G06F 2009/45595
See application file for complete search history.

(56) References Cited

U.S. PATENT DOCUMENTS

| 6,792,483 | B2 | 9/2004 | Schmidt |
| 7,782,869 | B1 | 8/2010 | Srinivasa |
| 8,250,586 | B2 | 8/2012 | Nelson |
| 8,745,237 | B2 | 6/2014 | Tsirkin et al. |
| 9,344,376 | B2* | 5/2016 | Armstrong .............. H04L 49/70 |
| 2007/0248009 | A1* | 10/2007 | Petersen ............. H04L 12/4633 370/230 |
| 2011/0194563 | A1 | 8/2011 | Swhen et al. |
| 2013/0089106 | A1* | 4/2013 | Tsirkin ................ H04L 49/9057 370/412 |
| 2013/0227562 | A1 | 8/2013 | Tsirkin et al. |

(Continued)

OTHER PUBLICATIONS

Jason Wang et al., "Re: (PATCHv2) Virtio-Spec: Virtio Network Device Multiqueue Support" Sep. 5, 2012, http://lists._Openwall._net/netdev/2012/09/05/4.

(Continued)

*Primary Examiner* — Gil H. Lee (74) *Attorney, Agent, or Firm* — Haynes and Boone, LLP (57) ABSTRACT

A method performed by a physical computing system includes, with a hypervisor, receiving a first packet from a virtual machine managed by the hypervisor, the first packet for transmission to a destination, the first packet including a first queue identifier, selecting a first transmission queue from a plurality of available transmission queues to transmit the first packet, the first transmission queue being based on the first queue identifier, receiving a second packet from the virtual machine, the second packet for transmission to the destination, the second packet including a second queue identifier, and selecting a second transmission queue from the plurality of available transmission queues to transmit the second packet, the second transmission queue being based on the second queue identifier.

19 Claims, 6 Drawing Sheets

(56) References Cited

U.S. PATENT DOCUMENTS

2015/0116310 A1* 4/2015 Baudouin .................. G06T 1/60
345/419
2015/0156124 A1* 6/2015 Tsuji ....................... H04L 47/20
370/230

OTHER PUBLICATIONS

"VMQ Receive Queues" http://msdn._Microsoft.com/en-us/library/windows/hardware/ff571046(v=vs.85).aspx.
Raj et al, "*Virtualization Services: Accelerated I/O Support in Mult-Core Systems*" College of Computing, Georgia Institute of Technology, 2010, http://www.cercs.gatech.edu/tech-reports/tr2010/git-cercs-10-09.pdf.
Jose et al., XvMotion: Unified Virtual Machine Migration over Long Distance: Stanford University; Vmware, Inc., Jun. 19-20, 2014, http://xenon._stanford._edu/~talg/papers/USENIXATC_14/xvmotion.pdf.

* cited by examiner

FIG. 6

GUEST-INFLUENCED PACKET TRANSMISSION

PRIORITY

The present application is a continuation of U.S. patent application Ser. No. 14/527,160 filed Oct. 29, 2014 and entitled "Guest-Influenced Packet Transmission," the disclosure of which is hereby incorporated by reference in its entirety.

BACKGROUND

The present disclosure relates generally to virtual systems, and more particularly, to packet transmissions from virtual systems.

A virtual machine is a piece of software that, when executed on appropriate hardware, creates an environment allowing the virtualization of an actual physical computer system. Each virtual machine running on the physical system may function as a self-contained platform, running its own operating system (OS) and software applications (processes) on one or more virtual processors.

A host machine (e.g., computer or server) is typically enabled to simultaneously run one or more virtual machines, where each virtual machine may be used by a local or remote client. The host machine allocates a certain amount of execution time from the host's physical processors to each of the virtual processors. Each virtual machine may use the allocated resources to execute applications, including operating systems known as guest operating systems.

Virtual machines often communicate with other computing devices, whether physical or virtual. When communicating with such other devices, standard networking protocols are often used. Thus, a virtual machine will transmit data packets to other devices. The hypervisor that is managing the virtual machine often has many network devices available from which to transmit a data packet. For example, the hypervisor may have multiple physical network devices or virtual network devices available. The hypervisor generally uses its own load balancing functions to determine which network devices are to be used to transmit a particular packet on behalf of a virtual machine. It is desirable to improve the manner in which such packets are transmitted to the appropriate destination.

SUMMARY

A method performed by a physical computing system includes, with a hypervisor, receiving a first packet from a virtual machine managed by the hypervisor, the first packet for transmission to a destination, the first packet including a first queue identifier, selecting a first transmission queue from a plurality of available transmission queues to transmit the first packet, the first transmission queue being based on the first queue identifier, receiving a second packet from the virtual machine, the second packet for transmission to the destination, the second packet including a second queue identifier, and selecting a second transmission queue from the plurality of available transmission queues to transmit the second packet, the second transmission queue being based on the second queue identifier.

A computing system includes a processor and a memory comprising machine readable instructions that when executed by the processor, cause the system to: run a hypervisor, receive a plurality of packets for transmission to a destination, each of the plurality of packets comprising a queue identifier, and select one of a plurality of transmission queues to transmit the packets based on each packet's queue identifier. The plurality of packets have different queue identifiers and are transmitted over different transmission queues to the destination.

A method performed by a virtual machine running on a physical computing system includes sending to a hypervisor, a first packet for transmission to a destination, the first packet including a first queue identifier, the first queue identifier indicating on which of a plurality of transmission queues the hypervisor is to transmit the first packet. The method further includes sending to the hypervisor, a second packet for transmission to the destination, the second packet including a second queue identifier, the second queue identifier indicating on which of a plurality of transmission queues the hypervisor is to transmit the second packet, the second packet to be transmitted to the destination on a different transmission queue than the first packet.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to improve the manner in which data packets from virtual machines are transmitted to the appropriate destination. According to principles described herein, the guest can influence the manner in which a packet is transmitted. Specifically, packets from a particular guest are provided with a queue identifier. The queue identifier informs the hypervisor a queue to which the packet is to be sent. The queues identified by the queue identifier may correspond to physical or virtual network devices available to the hypervisor. A network device is hardware, software, or combination of both that is used to transmit data to other computing devices. The queues identified by the queue identifier may correspond to multiple queues for a single network device as some network devices may utilize multiple queues for transmitting data packets.

Through use of the queue identifier, a guest can influence the manner in which data packets are transmitted from the host machine to the destination. This may provide a number of benefits. For example, a guest may have information about which network devices can more efficiently transmit data packets to the destination of those packets. Additionally, the guest may have its own load balancing function which may be more efficient than a load balancing function used by the hypervisor. Thus, the guest can tag multiple packets going to the same destination with different queue identifiers in order to achieve the desired load balancing function.

Figure 1:
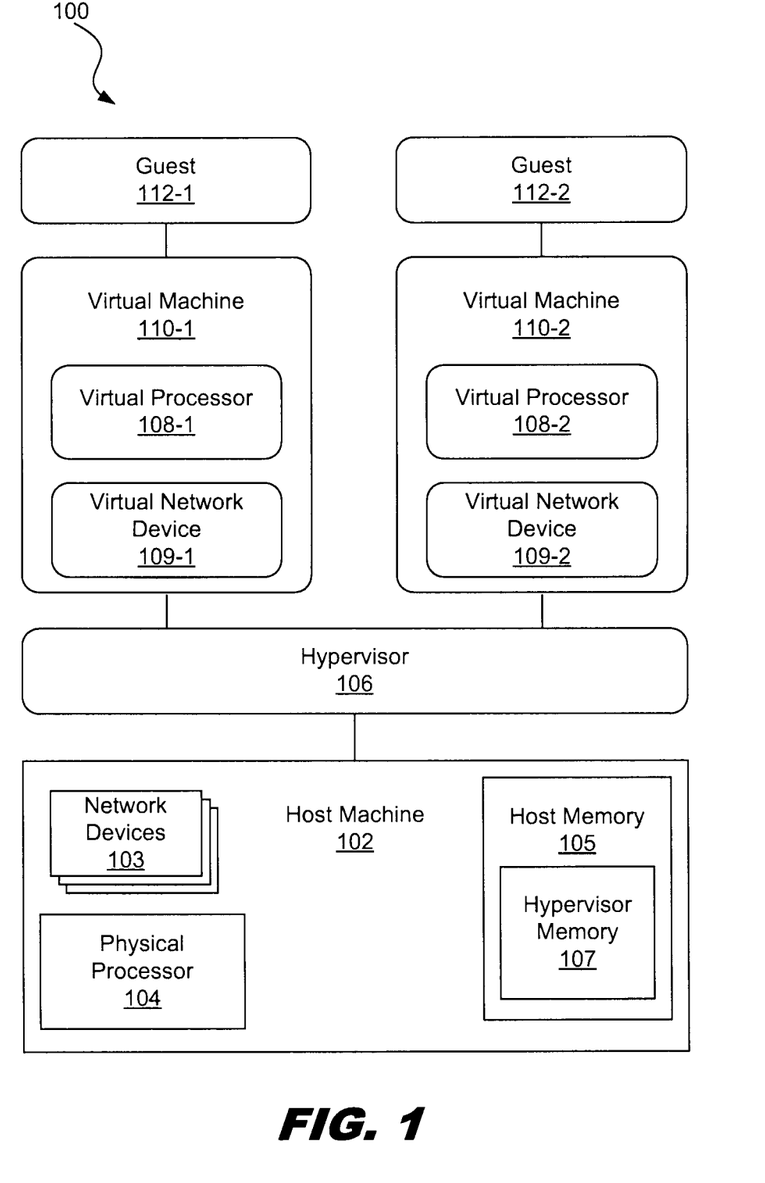
FIG. 1 is a diagram showing an illustrative host system running a plurality of virtual machines, according to one example of principles described herein.

FIG. 1 is a diagram showing an illustrative system 100 involving a plurality of virtual machines 110. According to the present example, a physical system, such as a host machine 102 includes hardware such as a set of processors 104 and a memory 105. The host machine 102 also includes a number of network devices 103. The system 100 also includes a hypervisor 106. The hypervisor 106 supports a first virtual machine 110-1 and a second virtual machine 110-2. Although two virtual machines 110 are illustrated, other examples including fewer than two virtual machines or more than two virtual machines are within the scope of the present disclosure. The virtual machines provide the guest operating systems 112 with a virtual platform on which to operate.

The hypervisor 106 allows for multiple virtual machines 110, and thus multiple guests 112, to run on the same physical host machine 102. Additionally, the host machine 102 may run the multiple guests 112 concurrently and in isolation from other programs on the host machine 102. One guest 112-1 may run different type of operating system than another guest 112-2 being run on the same host machine 102. Additionally, the operating system associated with a guest 112 running on a virtual machine 110 may be different from the host operating system running on the host machine 102.

A guest 112 may include anything executed on a virtual machine 110-1. For example, a guest 112 may include an operating system, applications running on that operating system, data storage associated with the applications and operating system, drivers, etc. in one example, a guest 112-1 may be packaged as a large set of data that is loaded into host memory 105. The hypervisor 106 then interacts with that large set of data to execute instructions on one of the virtual machines 110.

The host memory 105 may be one of several different types of memory. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software and data. The host memory 105 may designate various blocks of memory for use by the hypervisor 106 or for use by the virtual machines 110. Such designated blocks of memory are referred to as hypervisor memory 107. These blocks of memory may be ranges of physical memory addresses or virtual memory addresses.

The host machine 102 also includes a processor 104 for executing software (e.g., machine readable instructions) and using or updating data stored in memory 105. The software may include an operating system, the hypervisor 106 and various other software applications. The processor 104 may include one or more processors acting in concert.

In the example illustrated in FIG. 1, virtual machines 110 are platforms on which the guests 112 run. The virtual machines 110 include virtual processors 108 which are designed to appear to the guests 112 as physical processors. The hypervisor 106 manages the host machine 102 resources and makes them available to one or more guests 112 that alternately execute on the same hardware. The hypervisor 106 manages hardware resources and arbitrates requests of the multiple guests. In an example, the hypervisor 106 presents a virtual machine that includes a virtual set of Central Processing Unit (CPU), memory, I/O, and disk resources to each guest either based on the actual physical hardware or based on a standard and consistent selection of custom hardware. A virtual machine has its own address space in memory, its own processor resource allocation, and its own device input/output (I/O) using its own virtual device drivers.

The virtual machines 110-1 also include virtual network devices 109. Thus, when the guest 112 transmits or receives information from another entity, it does so through the virtual network device 109. The hypervisor 106 maps the virtual network devices 109 associated with the virtual machines 110 to one of the physical network devices 103 of the host machine 102. For example, the hypervisor 106 may map one virtual network device 109-1 to one network device 103 of the host machine and map a different virtual network device 109-2 to either the same or a different network device 103 of the host machine 102.

The hypervisor 106 can map a virtual resource or state (e.g., registers, memory, or files) to real resources in the underlying host machine 102. For example, the hypervisor 106 may present a guest memory to guest 112-1. The hypervisor 106 may map the memory locations of guest memory to physical memory locations of memory 105.

To facilitate multiple virtual machines 110 simultaneously, hardware resources are shared among the hypervisor 106 and one or more guests 112. The physical processors 104 of the host machines enter and exit the context of different virtual processors 108 and the hypervisor 106. A virtual machine exit marks the point at which a context switch occurs between the virtual processor 108 currently running and the hypervisor 106, which takes over control for a particular reason. During the context switch, the processor 104 may save a snapshot of the state of the virtual processor that was running at the time of exit. The virtual machine exit is handled by the hypervisor 106, which decides the appropriate action to take and then transfers control back to the virtual processor 108 via a virtual machine entry. A virtual machine entry marks the point at which a context switch occurs between the hypervisor 106 and a virtual processor 108, which takes over control.

The network devices 103 are used to transmit data to other computing devices. The network devices 103 may be hardwire devices for transmitting data over Ethernet or fiber optic cables. Additionally, the network devices 103 may include wireless devices that transmit data using radio waves or other wireless communication technologies. In some examples, multiple network devices may be bonded. For example, multiple network devices may share the same Internet Protocol (IP) address. The bonded network devices utilize a bonding driver.

Figure 2:
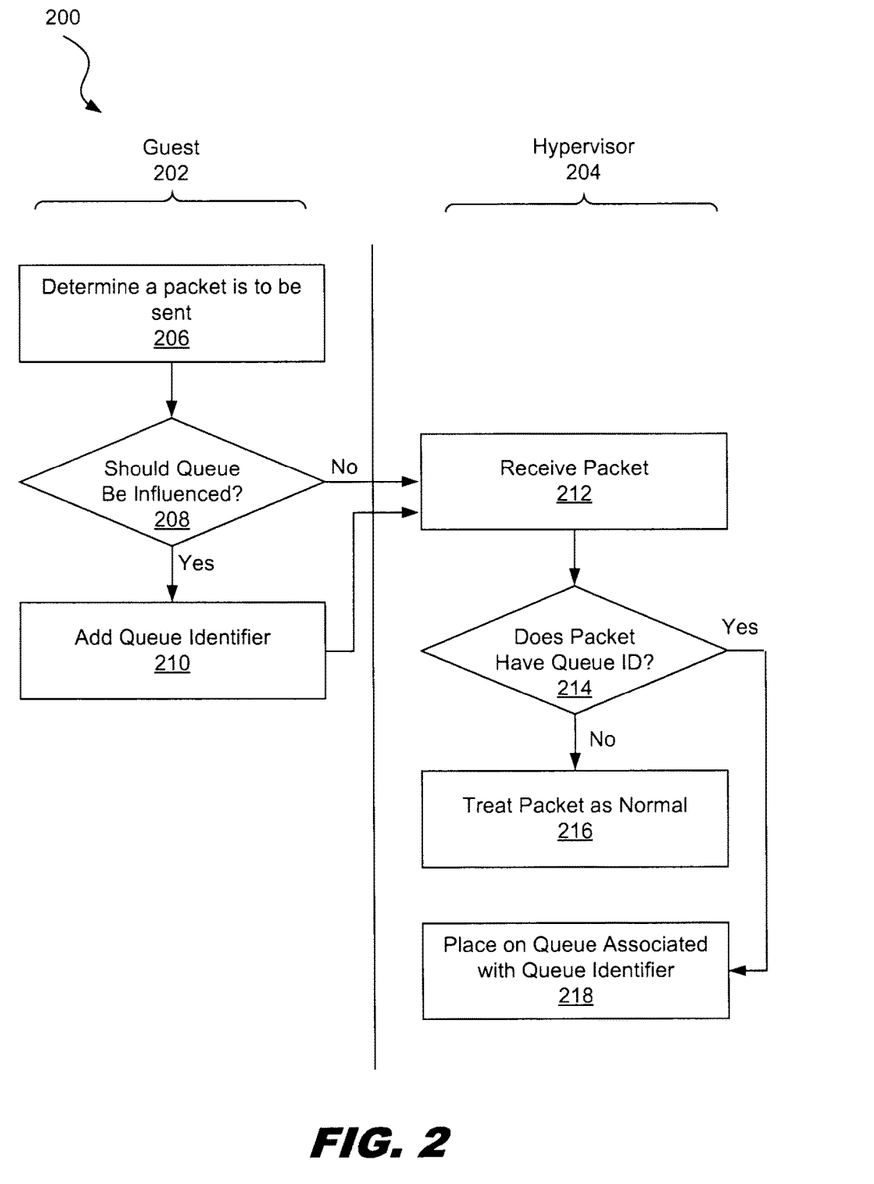
FIG. 2 is a flowchart showing an illustrative method for guest-influenced packet transmission, according to one example of principles described herein.

FIG. 2 is a flowchart showing an illustrative method for guest-influenced packet transmission. The steps performed by a guest 202 (e.g. 112, FIG. 1) are shown on the left side of FIG. 2. The steps performed by a hypervisor 204 (e.g. 106, FIG. 1) are shown on the right side of FIG. 2.

According to the present example, the method 200 includes a step 206 for determining that a packet is to be sent. Computing devices, including guests 112 running on virtual machines, regularly send data to other computing devices. Data is often formatted into packets, each packet including metadata such as source and destination addresses as well as the data to be transmitted. This formatting is typically done by a network device, which in the case of a virtual machine, is a virtual network device.

The method 200 further includes a step 208 for determining whether the queue on which the hypervisor is to transmit a particular packet should be influenced. In some cases, the guest may wish to let the hypervisor decide how to transmit the packet. But, in some cases, the guest may wish to influence the hypervisor regarding the queue on which the packet should be transmitted. If the guest 202 decides that the queue on which the packet is to be transmitted is not to be influenced, then the guest 202 simply passes the packet to the hypervisor as normal.

But, if the guest 202 decides that the queue on which the packet should be transmitted is to be influenced, then the method proceeds to step 210 at which a queue identifier is added to the packet. This may be done by the driver for the virtual network device of the virtual machine. As will be described in further detail below, the queue identifier may be added to a metadata portion of the packet such as the packet header.

The method 200 further includes a step 212 performed by the hypervisor 204 in which the hypervisor 204 receives a packet from the guest. Then, at step 214, the hypervisor determines whether the received packet has a queue identifier. If the received packet does not have a queue identifier, then the method proceeds to step 216 at which the packet is treated as normal. In other words, the hypervisor places the packet on whatever queue it determines based on its own decision making process.

The method 200 further includes a step 218 that is performed if the packet does indeed have a queue identifier. At step 218, the hypervisor places the packet on the transmission queue identified by the queue identifier. The packet is then transmitted on that transmission queue to its destination. In some cases, as will be described in further detail below, the guest utilizes a translation table to determine the appropriate transmission queue based on the received queue identifier.

In some examples, when a guest transmits multiple packets going to the same destination, the guest 202 can assign different queue identifiers to different packets in order to tune the load balancing as desired. Thus, multiple packets going to the same destination are transmitted on different queues based on the queue identifiers assigned to those packets.

Figure 3:
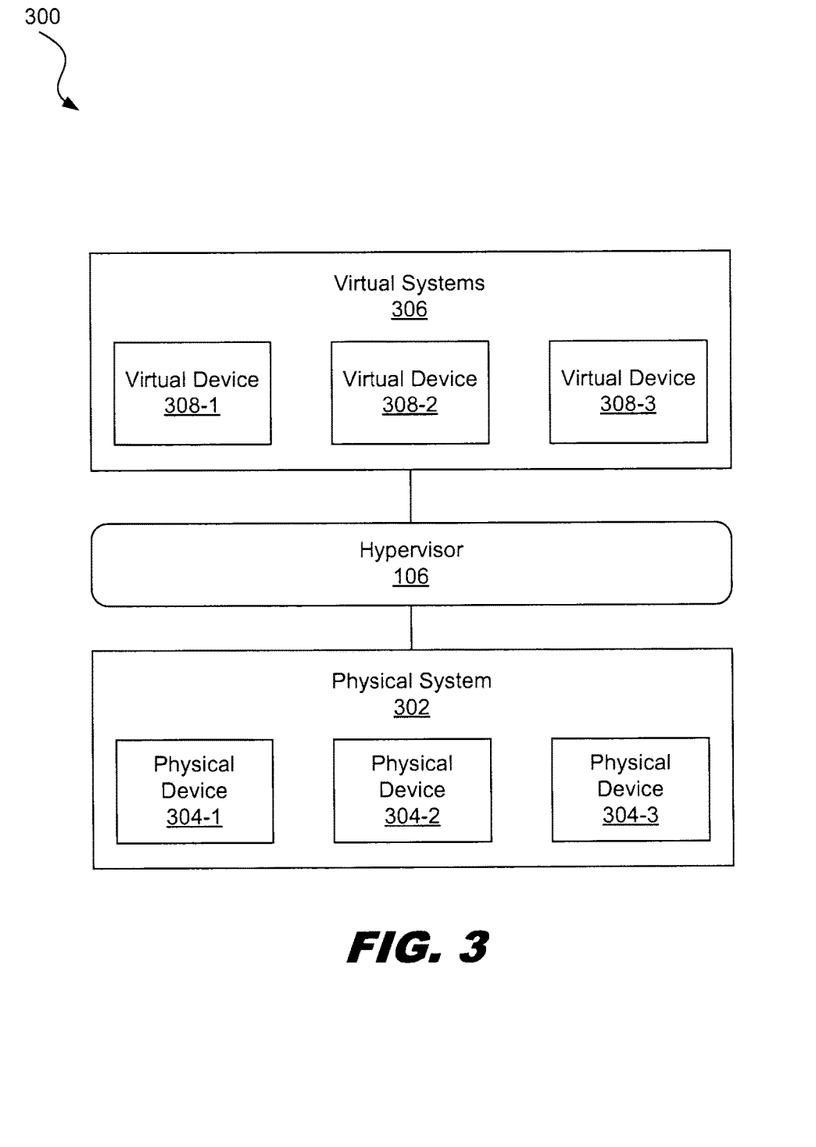
FIG. 3 is diagram showing illustrative multiple physical network devices and multiple virtual network devices available for transmitting a packet, according to one example of principles described herein.

FIG. 3 is diagram showing illustrative multiple physical network devices and multiple virtual network devices available for transmitting a packet. According to the present example, the hypervisor has many network devices available on which to transmit a packet from a virtual machine. For example, there may be multiple physical network devices 304 of a physical system 302 available. The physical system 302 may include the host machine (e.g. 102, FIG. 1). The hypervisor may also have multiple virtual network devices 308 of a virtual system 306 available for transmission of packets. The virtual network devices are mapped to underlying physical network devices.

In one example, a queue is associated with each of the available network devices 304, 308. For example, queue 1 may be associated with virtual network device 308-1, queue 2 may be associated with virtual network device 308-2, queue 3 may be associated with virtual network device 308-3, queue 4 may be associated with physical network device 304-1, queue 5 may be associated with physical network device 304-2, and queue 6 may be associated with physical network device 304-3.

Upon receiving a packet from a virtual machine, the hypervisor 106 looks at the queue identifier of the received packet. In this example, the queue identifier is a number between 1 and 6. Based on the queue identifier, the hypervisor will use the corresponding network device to transmit the packet. For example, if the queue identifier is 5, then the hypervisor will use physical network device 304-2, which corresponds to queue 5, to transmit the packet to its destination.

Figure 4:
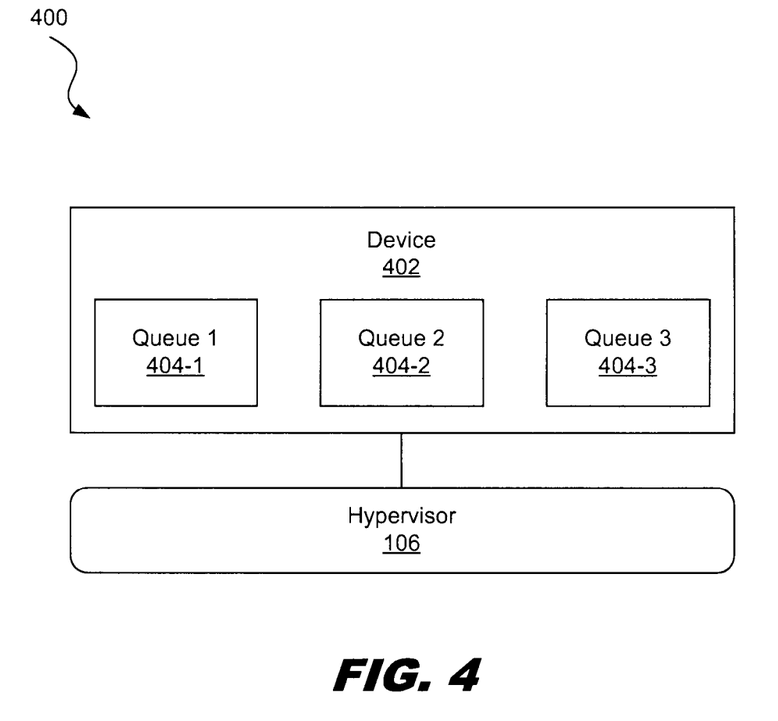
FIG. 4 is a diagram showing an illustrative network device having multiple queues, according to one example of principles described herein.

FIG. 4 is a diagram showing an illustrative network device having multiple queues. According to the present example, a network device 402 available for transmitting a packet may have multiple queues. The network device 402 may be a physical network device or a virtual network device and may correspond to any of the network devices 304, 308 of FIG. 3. Some network devices utilize multiple queues for transmitting packets. In one example, a network device may have many physical ports, each port being associated with a different queue. A packet being transmitted to a particular destination may reach that destination through any one of those ports. Thus, the packet can get to the desired destination through any of the queues 404.

In the present example, the network device 402 has three queues 404, particularly, a first queue 404-1, a second queue 404-2, and a third queue 404-3. In one example, each of the queues 404 is assigned a queue identifier. In some examples, a queue identifier identifies both a network device 402 and a queue 404 of that network device. Thus, in cases where there are multiple network devices, each network device having multiple queues, the queue identifier can appropriately identify a particular queue on a particular network device.

In some cases, a network device may have multiple queues because the network device may represent a bonding of multiple network devices. Multiple network devices can be bonded together to provide enhanced speed. In such case, a single bonding driver controls each of the network devices. The bonded network devices may be referred to as bonding slaves. The bonded network devices can share a logical address such as an IP address.

Figure 5:
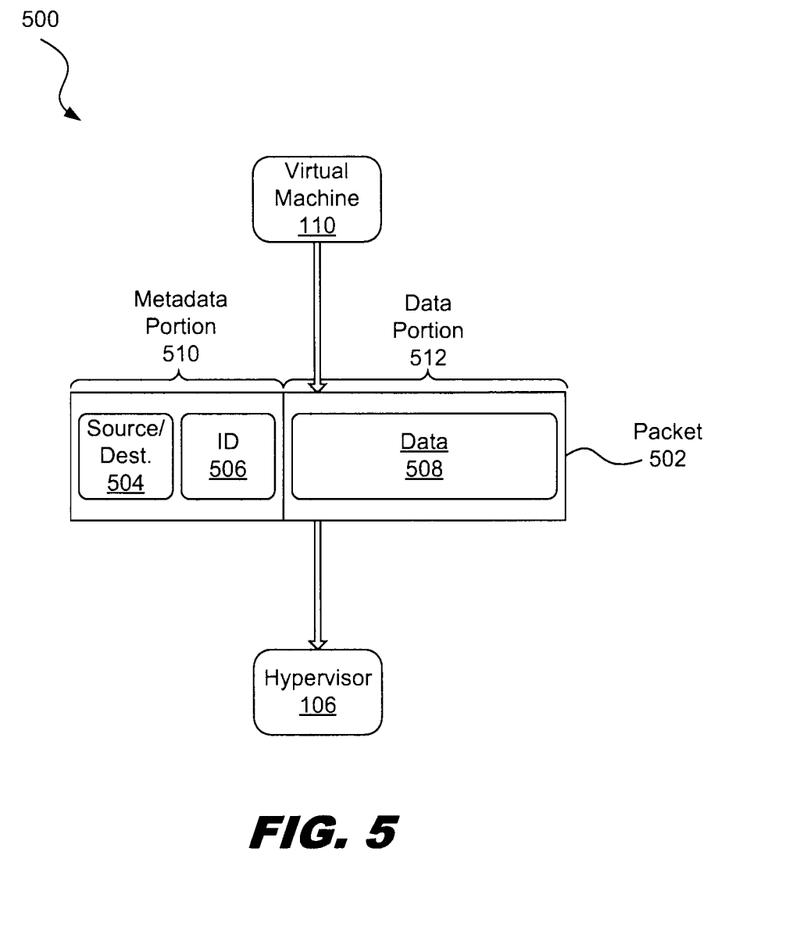
FIG. 5 is a diagram showing illustrative components of a packet sent from a virtual machine to a hypervisor, according to one example of principles described herein.

FIG. 5 is a diagram showing illustrative components of a packet sent from a virtual machine 110 to a hypervisor 106. Specifically, the hypervisor receives a packet 502 from a virtual network device (e.g. 109, FIG. 1) of the virtual machine 110. The packet 502 includes a metadata portion 510 and a data portion 512. The data portion 512 of the packet includes the actual data 508 that is being transmitted.

The metadata portion 510 includes a variety of metadata for the packet. In some protocols, the metadata portion is referred to as the packet header. The metadata portion 510 includes the source and destination addresses, of the packet 502. The metadata portion 510 also includes an identification field. The identification field 506 can be used to store queue identifiers that influence how the hypervisor handles the packet 502. Specifically, the thread identifier identifies the queue on which the hypervisor is to transmit the packet to its destination.

Figure 6:
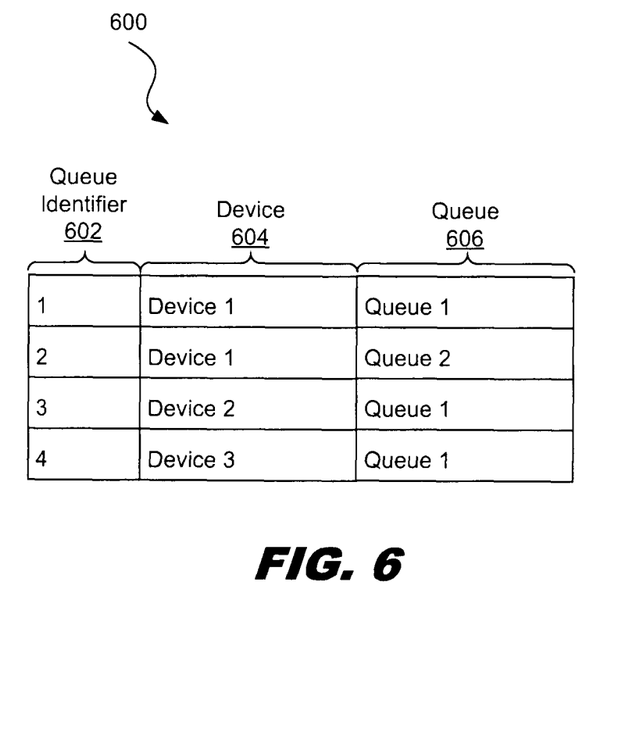
FIG. 6 is a diagram showing an illustrative translation table for transmitting packets, according to one example of principles described herein.

FIG. 6 is a diagram showing an illustrative translation table for transmitting packets. According to the present example, the hypervisor (e.g. 106, FIG. 1) can use a translation table 600 to map queue identifiers to specific network devices and queues within those network devices. Thus, the translation table 600 is a mechanism by which the hypervisor uses the queue identifier contained within a received packet to determine the transmission queue on which the packet should be transmitted to its destination. In this example, the translation table includes a queue identifier column 602, a network device column 604 and a queue column 606.

For example, queue identifier 1 corresponds to network device 1 and queue 1. Queue identifier 2 also corresponds to network device 1, but to queue 2. Thus, in this example, network device 1 has two queues. Queue identifier 3 corresponds to network device 2 and queue 1. Queue identifier 4 corresponds to network device 3 and queue 1. Thus, network devices 2 and 3 only have one queue in this example. Using the example of FIG. 6, if a hypervisor receives a packet with queue identifier 2, then the hypervisor uses the translation table to determine that the packet should be transmitted on queue 2 of network device 1.

In some examples, a queue identifier may be higher than the number of available queues. For example, in the case of FIG. 6, the hypervisor may receive a packet with a queue identifier of 7. But, because there is no queue 7, the hypervisor will have to determine how to handle such a packet. In one example, the hypervisor performs a modulus operation on the queue identifier using the total number of queues. For example, the hypervisor can perform the calculation 7 modulus 4. This results in the remainder after dividing 7 by 4, which results in the value 3. Thus, the hypervisor can proceed as if the queue identifier of the packet was queue identifier 3. Thus, the hypervisor transmits the packet on queue 1 of network device 2.

Through use of principles described herein, virtual machines can influence the manner in which a hypervisor transmits packets in the case where the hypervisor has multiple queues available for transmitting the packet. This can allow for finer tuning of load balancing and thus increase the efficiency at which the host machine handles multiple virtual machines. Thus, the performance of the host machine is increased.

Some examples of processing systems described herein may include non-transient, tangible, machine readable media that include executable code that when run by one or more processors (e.g., processor 104) may cause the one or more processors to perform the processes of the methods described above. Some common forms of machine readable media that may include the processes of the methods are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a physical computing system, the method comprising:
   with a hypervisor, receiving a first packet and a second packet from a virtual machine, the first packet and the second packet for transmission to a destination, the first packet including a first queue identifier and the second packet including a second queue identifier, wherein the first queue identifier and the second queue identifier are assigned by the virtual machine based on a load balancing function; and
   transmitting the first packet over the first transmission queue to the destination, the first transmission queue being based on the first queue identifier.

2. The method of claim 1, further comprising, with the hypervisor, selecting a first transmission queue from a plurality of available transmission queues to transmit the first packet.

3. The method of claim 2, further comprising, with the hypervisor, selecting a second transmission queue from the plurality of available transmission queues to transmit the second packet and transmitting the second packet over the second transmission queue, the second transmission queue being based on the second queue identifier, the second transmission queue being different than the first transmission queue.

4. The method of claim 3, wherein the first transmission queue is associated with a first physical network device and the second transmission queue is associated with a second physical network device of a host machine that executes the virtual machine.

5. The method of claim 3, wherein the first transmission queue is associated with a first port of a physical network device and the second transmission queue is associated with a second port of the physical network device.

6. The method of claim 1, further comprising, mapping a virtual network device of the virtual machine to a physical network device of a host machine that is executing the hypervisor.

7. The method of claim 4, wherein the physical network device is one of a plurality of physical network devices on the host machine, the plurality of physical network devices being bonded to share an Internet Protocol (IP) address.

8. The method of claim 1, wherein the first queue identifier is assigned by a driver of a virtual network device of the virtual machine.

9. The method of claim 1, further comprising, with the hypervisor, maintaining a translation table, the translation table including a queue identifier column, a network device column, and a queue column.

10. The method of claim 8, further comprising:
    in response to determining that the first queue identifier exceeds the total number of queues, performing a modulus operation on the first queue identifier; and
    using a result of the modulus operation as the first queue identifier.

11. The method of claim 1, wherein the first queue identifier is stored within an identification field of a packet header for the first packet.

12. A computing system comprising:
    a processor; and a memory comprising machine readable instructions that when executed by the processor, cause the system to:
  run a hypervisor;
  with the hypervisor, receive a plurality of packets for transmission to a destination, each of the plurality of packets comprising a queue identifier, wherein each packet's queue identifier is assigned by a virtual machine based on a load balancing function; and
  transmit each of the plurality of packets over a different transmission queue to the destination based on different queue identifiers associated with each packet.

13. The system of claim 12, wherein the system is further to, with the hypervisor, select one of a plurality of transmission queues to transmit the packets based on each packet's queue identifier.

14. The system of claim 12, wherein the transmission queues correspond to multiple queues associated with a single physical or virtual network device from which to transmit the packets to the destination.

15. The system of claim 12, wherein the queue identifiers are stored within an identification field of a packet header for the corresponding packets.

16. The system of claim 12, wherein the processor is further to cause the system to, with the hypervisor, use a translation table to determine a network device on which to transmit a packet, the translation table correlating queue identifiers with network devices.

17. A method performed by a virtual machine running on a physical computing system, the method comprising:
  sending to a hypervisor, a first packet for transmission to a destination, the first packet including a first queue identifier assigned by the virtual machine based on a load balancing function, the first queue identifier indicating on which of a plurality of transmission queues the hypervisor is to transmit the first packet; and
  sending to the hypervisor, a second packet for transmission to the destination, the second packet including a second queue identifier assigned by the virtual machine based on the load balancing function, the second queue identifier indicating on which of a plurality of transmission queues the hypervisor is to transmit the second packet, the second packet to be transmitted to the destination on a different transmission queue than the first packet, the second queue identifier associated with a second transmission device; and
  transmitting the first packet over one of the plurality of transmission queues to the destination based on the first queue identifier.

18. The method of claim 17, wherein the plurality of transmission queues comprises queues for a plurality of physical or virtual network devices.

19. The method of claim 17, wherein the first queue identifier is stored within a metadata portion of the first packet.

* * * * *